(12) United States Patent
Iseringhausen et al.

(10) Patent No.: US 10,725,537 B2
(45) Date of Patent: Jul. 28, 2020

(54) EYE TRACKING SYSTEM USING DENSE STRUCTURED LIGHT PATTERNS

(71) Applicant: Facebook Technologies, LLC, Menlo Park, CA (US)

(72) Inventors: Julian Iseringhausen, Redmond, WA (US); Robert Dale Cavin, Kirkland, WA (US); Nicholas Daniel Trail, Bothell, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 310 days.

(21) Appl. No.: 15/722,259

(22) Filed: Oct. 2, 2017

(65) Prior Publication Data
US 2019/0101978 A1 Apr. 4, 2019

(51) Int. Cl.
*G06F 3/01* (2006.01)
*G02B 27/01* (2006.01)
*G02B 27/00* (2006.01)
*G06F 1/16* (2006.01)

(52) U.S. Cl.
CPC ......... *G06F 3/013* (2013.01); *G02B 27/0093* (2013.01); *G02B 27/0172* (2013.01); *G06F 1/163* (2013.01); *G06F 3/011* (2013.01); *G06F 3/012* (2013.01); *G02B 27/0101* (2013.01); *G02B 2027/0178* (2013.01)

(58) Field of Classification Search
CPC ........ G02B 25/001; G02B 9/34; G02B 23/14; G02B 13/004; C08L 2666/02

USPC ........................................................ 359/644
See application file for complete search history.

(56) References Cited

U.S. PATENT DOCUMENTS

| 6,702,809 | B1* | 3/2004 | Knopp | A61B 3/113 351/210 |
|---|---|---|---|---|
| 9,208,566 | B2 | 12/2015 | Chen et al. | |
| 2013/0176533 | A1 | 7/2013 | Raffle et al. | |
| 2014/0049609 | A1 | 2/2014 | Wilson et al. | |
| 2015/0193920 | A1* | 7/2015 | Knee | H04N 5/23229 382/154 |
| 2017/0123526 | A1* | 5/2017 | Trail | G02B 27/0093 |

FOREIGN PATENT DOCUMENTS

WO WO2016/142489 A1 9/2016

OTHER PUBLICATIONS

Extended European Search Report, European Application No. 18197999.8, dated Feb. 12, 2019, 8 pages.
(Continued)

*Primary Examiner* — Mohammed A Hasan
(74) *Attorney, Agent, or Firm* — Fenwick & West LLP

(57) ABSTRACT

An eye tracking system comprises a structured light emitter, a camera assembly, and a controller. The structured light emitter illuminates a portion of an eye of a user with a dense structured light pattern. The dense structured light pattern produces a distorted illumination pattern on the portion of the eye. The camera assembly captures one or more images of the distorted illumination pattern that is associated with the portion of the eye. The controller estimates a position of the eye based on the captured one or more images and a model of the eye. The eye tracking system may be part of a head-mounted display.

18 Claims, 7 Drawing Sheets

(56) References Cited

OTHER PUBLICATIONS

Hua, H. et al., "Video-based eye tracking methods and algorithms in head-mounted displays," Optics Express, Jan. 2006, vol. 14, No. 10, p. 4328-4350.
PCT International Search Report and Written Opinion, PCT Application No. PCT/US2018/051748, dated Jan. 31, 2019, 13 pages.

* cited by examiner

EYE TRACKING SYSTEM USING DENSE STRUCTURED LIGHT PATTERNS

BACKGROUND

The present disclosure generally relates to eye tracking, and specifically relates to using dense structured light patterns for eye tracking.

Eye tracking refers to the process of detecting the direction of a user's gaze, which may comprise detecting an orientation of an eye in 3-dimensional (3D) space. Eye tracking in the context of headsets used in, e.g., virtual reality and/or augmented reality applications can be an important feature. Conventional systems commonly use a small number of light sources (e.g., ~8) that emit light which is reflected by the eye, and a camera is used to image the reflection of the light sources from the eye. An orientation of the eye is determined using the captured images. But, the small number of light sources results in a limited model of the eye with a lot of inaccuracies. Moreover, conventional eye tracking systems fail to account for the reflected light from the iris that is refracted by the cornea, and instead simply assume all captured light is a reflection from the cornea.

SUMMARY

An eye tracking system tracks one or both eyes of a user. The eye tracking system includes a structured light emitter, a camera assembly, and a controller. The structured light emitter illuminates a portion of an eye of the user with a dense structured light pattern. A dense structured light pattern is a pattern of a large number (e.g., 225 or more) of densely packed structured light features (e.g., a dots). For example, a dense structured light pattern may be a 30×30 grid of dots that are projected over a target area (e.g., a 15 mm×15 mm area that includes the user's cornea). In this example, the dense structured light pattern has a dot spacing of 0.5 mm over the entire target area. The dense structured light pattern produces a distorted illumination pattern on a portion of a surface of the eye. The distortion is caused by, e.g., the shape of the eye as well as reflections from an iris of the eye that are refracted by the cornea. The structured light emitter may generate the structured light pattern (e.g., in an infrared band) using, e.g., one or more light sources, a diffractive optical element, a plurality of extraction features in a feature waveguide, etc.

The camera assembly includes one or more cameras. The camera assembly captures one or more images of the distorted illumination pattern. The one or more cameras are at least sensitive to a band of light (e.g., infrared) that includes the dense structured light pattern. In other embodiments, the one or more cameras are sensitive in multiple bands of light, e.g., near-infrared and visible light.

The controller estimates a position of the eye using the one or more captured images and a model of the eye. The controller estimates the position using structured light features identified in the captured one or more images. In some instances, the controller identifies an apparent location of a feature on a cornea of the eye, and calculates an actual location of the feature on an iris of the eye using the index of refraction of the cornea and an index of refraction of the anterior chamber. As an image of the eye reflecting a dense structured light pattern includes a large number of structured light features (e.g., more than 225 dots) the controller is able to generate a very accurate estimation of the eye's position. Moreover, the controller is able to determine an eye's gaze angle without having to determine a location of the pupil as is done in conventional systems.

The eye tracking system may be part of a head-mounted display (HMD) that is part of an HMD system that is configured to present content via the HMD to the user. The HMD system can be used in a virtual reality (VR) or other system environments such as augmented reality (AR) or mixed reality (MR) systems.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
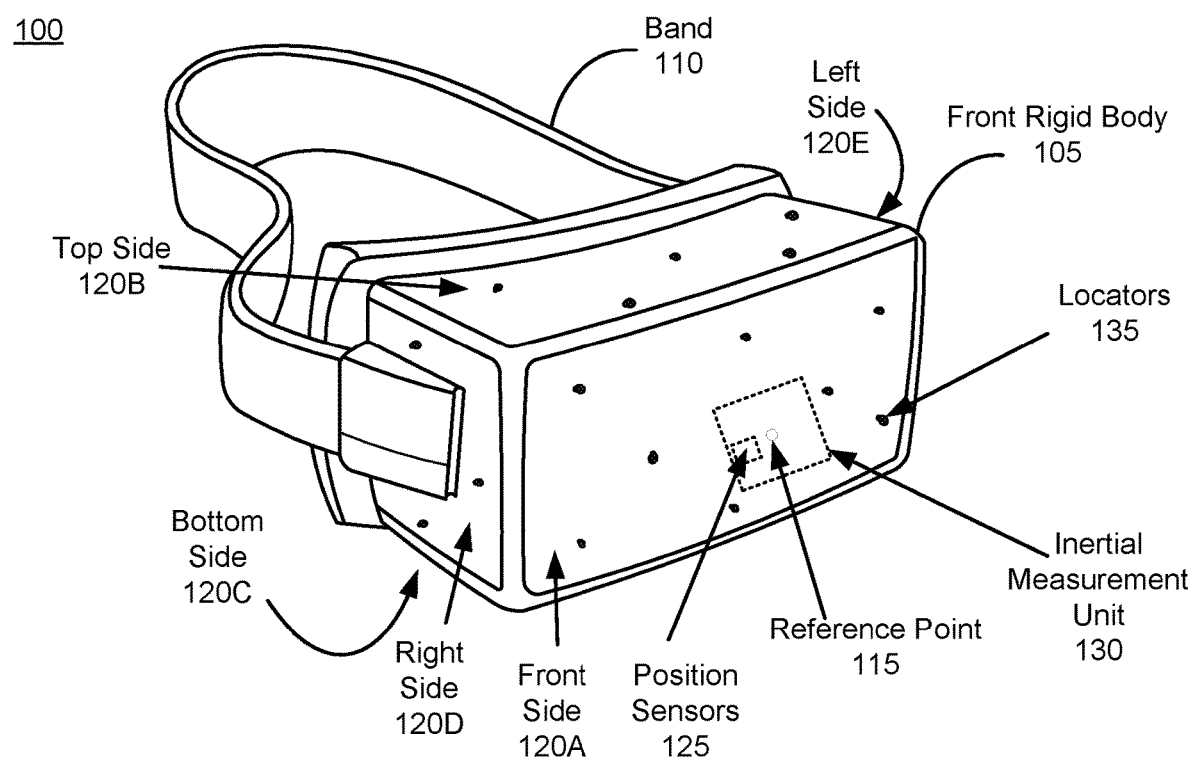
FIG. 1 is a diagram of an HMD, in accordance with an embodiment.

FIG. 1 is a diagram of an HMD 100, in accordance with an embodiment. The HMD 100 may be a part of, e.g., a VR system, an AR system, a MR system, or some combination thereof. The HMD 100 includes a front rigid body 105 having a front side 120A, top side 120B, bottom side 120C, right side 120D, and left side 120E, and a band 110. In embodiments that describe AR system and/or a MR system, portions of a front side 120A of the HMD 100 are at least partially transparent in the visible band (~380 nm to 750 nm), and portions of the HMD 100 that are between the front side 120A of the HMD 100 and an eye of the user are at least partially transparent (e.g., a partially transparent electronic display).

The front rigid body 105 includes one or more electronic displays (not shown in FIG. 1), an inertial measurement unit (IMU) 130, one or more position sensors 125, and one or more locators 135. In the embodiment shown by FIG. 1, the position sensors 125 are located within the IMU 130, and neither the IMU 130 nor the position sensors 125 are visible to the user.

The locators 135 may be located in fixed positions on the front rigid body 105 relative to one another and relative to a reference point 115. In the example of FIG. 1, the reference point 115 is located at the center of the IMU 130. Each of the locators 135 may emit light that is detectable by an imaging device (e.g., an imaging device 710 illustrated in FIG. 7, described in greater detail below). In some embodiments, the locators 135 may comprise passive elements (e.g., a retroreflector) configured to reflect light from a light source that may be detectable by an imaging device. Locators 135, or portions of locators 135, are located on the front side 120A, the top side 120B, the bottom side 120C, the right side 120D, and/or the left side 120E of the front rigid body 105 in the example of FIG. 1. The imaging device may be configured to determine a position (includes orientation) of the HMD 100 based upon the detected locations of the locators 135, which may be used to determine the content to be displayed to the user. For example, where the HMD 100 is part of a HMD system, the position of the HMD 100 may be used to determine which virtual objects positioned in different locations are visible to the user of the HMD 100.

Figure 2:
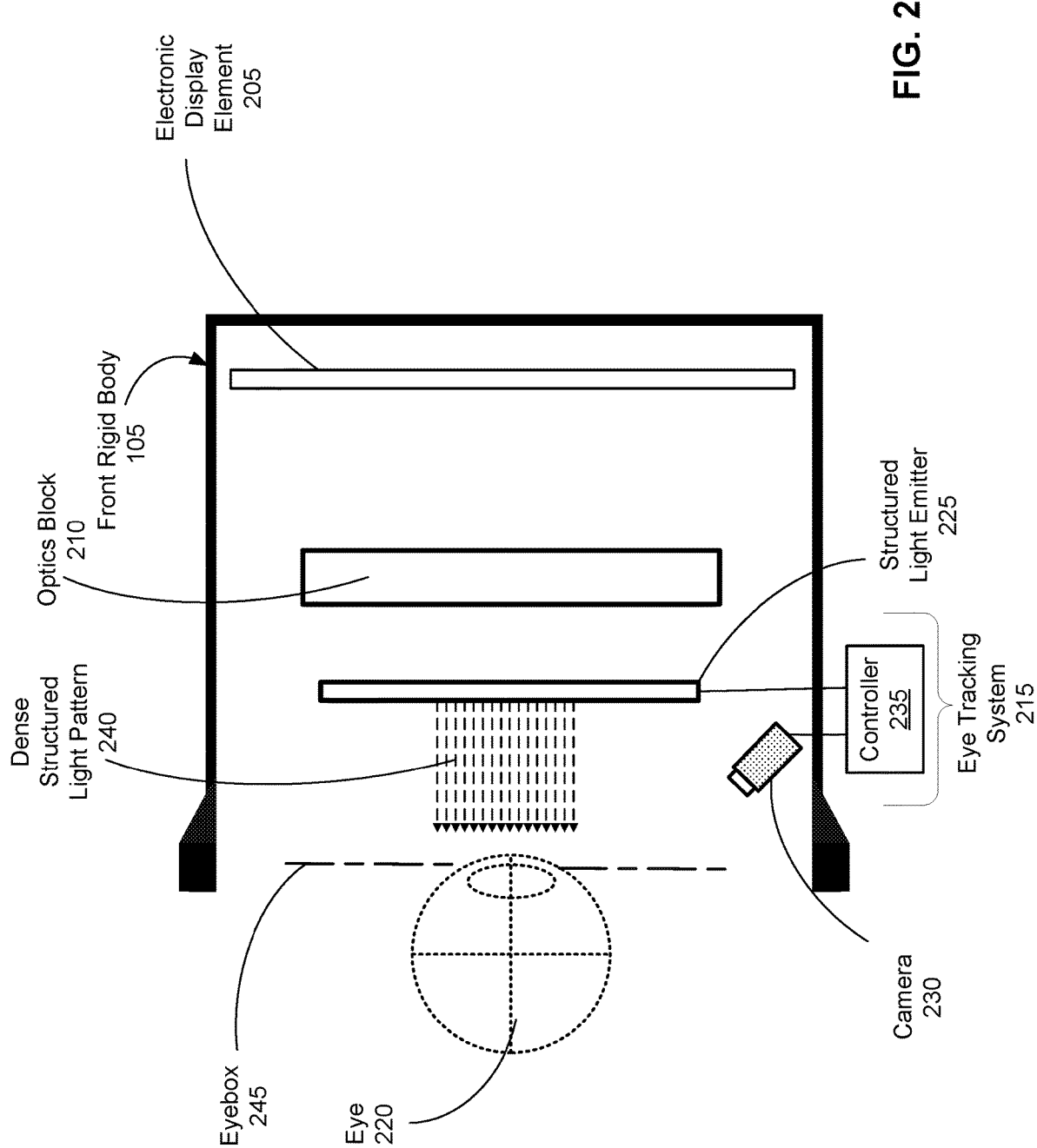
FIG. 2 is a cross section of a front rigid body of the HMD shown in FIG. 1.

FIG. 2 is a cross section 200 of the front rigid body 105 of the HMD 100 shown in FIG. 1. As shown in FIG. 2, the front rigid body 105 includes an electronic display element 205, an optics block 210, and an eye tracking system 215. For purposes of illustration, FIG. 2 shows a cross section of the front rigid body 105 in accordance with a single eye 220. Although FIG. 2 depicts a center cross-section of the eye 220 as being in the same plane as the eye tracking system 215, the center cross-section of the eye 220 and the eye tracking system 215 do not have to be in the same plane. Additionally, another electronic display element 205 and optics block 210, separate from those shown in FIG. 2, may be included in the front rigid body 105 to present content to another eye of the user.

The electronic display element 205 displays images and/or video to the user as generated by the HMD 100 or another device. In particular, the electronic display element 205 emits image light toward the optics block 210. Examples of the electronic display element 205 include: a liquid crystal display (LCD), an organic light emitting diode (OLED) display, an active-matrix organic light-emitting diode display (AMOLED), a transparent organic light-emitting diode display (TOLED), some other display, or some combination thereof.

The optics block 210 magnifies received image light from the electronic display element 205, corrects optical errors associated with the image light, and presents the corrected image light to a user of the HMD 100. The optics block 210 directs the magnified and/or corrected image light to an eyebox 245 for presentation to a user wearing the HMD 100. The eyebox 245 is a location in space that would be occupied by an eye 220 of a user of the HMD 100.

In an embodiment, the optics block 210 includes one or more optical elements and/or combinations of different optical elements. For example, an optical element is an aperture, a Fresnel lens, a convex lens, a concave lens, a filter, or any other suitable optical element that affects the image light emitted from the electronic display element 205. In some embodiments, one or more of the optical elements in the optics block 210 may have one or more coatings, such as anti-reflective coatings.

Magnification of the image light by the optics block 210 allows the electronic display element 205 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 210 is designed so its effective focal length is larger than the spacing to the electronic display element 205, which magnifies the image light projected by the electronic display element 205. Additionally, in some embodiments, the amount of magnification is adjusted by adding or removing optical elements.

In some embodiments, the optics block 210 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display element 205 for display is pre-distorted, and the optics block 210 corrects the distortion when it receives image light from the electronic display element 205 generated based on the content.

The eye tracking system 215 track a position of the eye 220. The eye tracking system 215 comprises a structured light emitter 225, a camera 230, and a controller 235. Although only one eye 220 of the user is shown in FIG. 2, in some embodiments, the eye tracking system may include at least one structured light emitter 225 and at least one camera 230 for each eye of the user. In some embodiments, separate eye tracking systems may be implemented for each eye of the user.

The structured light emitter 225 illuminates a portion of the eye 220 with a dense structured light pattern 235 in accordance with tracking instructions (e.g., from the controller 235). In some embodiments, the structure light emitter 225 includes one or more light sources and a feature waveguide. A light source emits light in the infrared (IR) band (~750 nm to 1700 nm). The light source may be, e.g., a light emitted diode (LED), a micro LED, a laser diode, a tunable laser, etc. Light from the one or more sources is coupled into the feature waveguide.

The feature waveguide generates the dense structured light pattern 240 using light from the one or more sources. The feature waveguide is a waveguide that includes a plurality of extraction features that are spread throughout the waveguide. Each extraction feature outcouples light from the one or more sources towards the eyebox 245. An extraction feature may be, e.g., a small ink dot, an indent in a surface of the waveguide, some other extraction feature that outcouples light from the one or more sources towards the eyebox 245, or some combination thereof. Additional details describing extraction features, more generally, the structured light emitter may be found in U.S. Pat. App. Nos. 62/485,606 and 62/486,527, both of which are herein incorporated by reference in their entirety. The feature waveguide is transparent is transparent in the band of light emitted by the electronic display panel 205 (e.g., visible band), and the extraction features are small enough such that they do not generally impact the image quality of the content presented by the electronic display panel 205.

In alternate embodiments (not shown), the structured light emitter 225 does not include a feature waveguide, and instead includes one or more diffractive optical elements (DOEs) and a projection assembly. The DOE converts light from the one or more light sources into the dense structured light pattern 245. A DOE may be, e.g., one or more diffraction gratings, a diffuser, a spatial light modulator, some other element that forms the dense structured light pattern 245, or some combination thereof. The projection assembly projects the dense structured light pattern into the eyebox 245. The projection assembly includes one or more optical elements (e.g., lens, polarizer, etc.) that project the dense structured light pattern 245 into the eyebox 245.

Note, while the structured light emitter 225 is illustrated as being located between the optics block 210 and the eye 220, in alternate embodiments, some or all of the structured light emitter 225 may be located elsewhere. For example, some or all of the structured light emitter 225 may be part of the optics block 210, or may be located between the optics block 210 and the electronic display element 205.

A dense structured light pattern is a pattern of a large number (e.g., 225 or more) densely packed structured light features within a target area (e.g., a surface of the eye 220). The target area is an area of the eye 220 that the eye tracking system 215 uses to track the eye 220. In some embodiments, the target area includes some or all of a cornea of the eye 220. The target area may also include some of the sclera of the eye 220. In some embodiments, the target area has at least a diameter of 12 mm (diameter of an adult cornea is ~11.5 mm). But in other embodiments, the target area may be substantially larger (15 mm or more). The target area may have any shape, e.g., circular, rectangular, square, elliptical, etc.

A structured light feature is one or more reflected points of light that together form a unique reflectance configuration. A point of light can be, e.g., a dot or some other shape. The structured light features may include one or more structured light features that have the same shape, but different size. The structured light features may include one or more structured light features that have the same size, but have different shapes. One or more structured light features form a reflectance group. A reflectance group uniquely identifies its location within the dense structure light pattern 240 based upon its configuration (e.g., feature shape, feature size, spatial configuration, etc.). For example, in embodiments where there are multiple structured light features in a reflectance group, a spatial configuration (i.e., location of the structured light features relative to one another) between structured light features in the reflectance group may also be used to differentiate the reflectance group from other reflectance groups in the dense structured light pattern 240.

For example, a dense structured light pattern may be a 30×30 grid of dots that are projected over a target area (e.g., a 15 mm×15 mm area that includes the user's cornea). In this example, the dense pattern has a dot spacing of 0.5 mm over the entire target area. In contrast, conventional systems— over the same target area would have a very limited set of illuminators (e.g., 8). The dense structured light pattern 240 produces a distorted illumination pattern on a portion of a surface of the eye. The distortion is caused by, e.g., the shape of the eye as well as reflections from an iris of the eye that are refracted by the cornea (as discussed in detail below with regard to FIG. 5).

The camera 230 captures images of the dense structured light pattern 245 reflected from the target area. The reflected light includes, e.g., reflections of the dense structured light pattern 245 from portions of the eye 220 in the target area (e.g., cornea, iris, and/or sclera). The camera 230. A camera may be, e.g., an array (1D or 2D) of photodiodes, a charge coupled display (CCD) array, some other device capable of detecting some or all of the dense structured light pattern 245, or some combination thereof. The camera 230 captures the images in accordance with tracking instructions generated by the controller 235.

The controller 235 controls components of the eye tracking system 215. The controller 235 generates tracking instructions for the structured light emitter 225 and the camera 230. In some embodiments, the controller 235 receives one or more images of the user's eye 220 captured by the camera assembly 230. As discussed in detail below with regard to FIG. 3, the controller 235 determines eye tracking information (e.g., eye position) using the one or more images.

Figure 3:
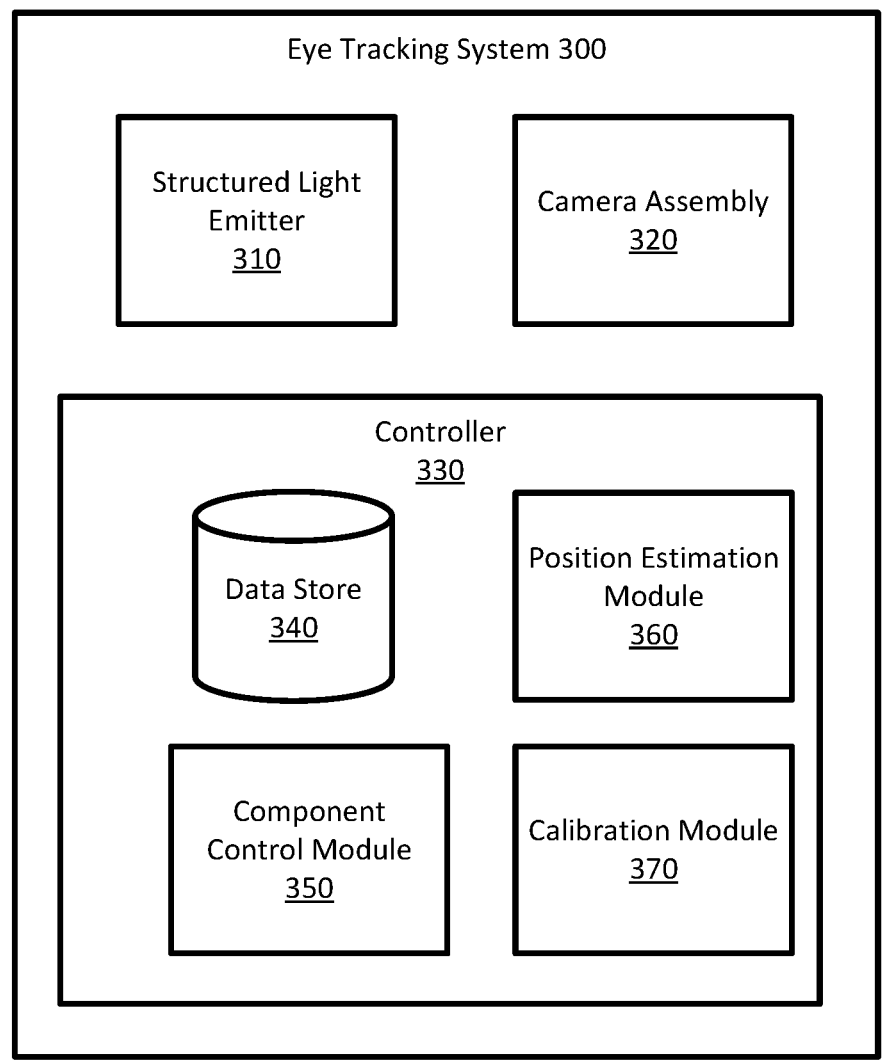
FIG. 3 a block diagram of an eye tracking system in accordance with an embodiment.

FIG. 3 is a block diagram of an eye tracking system 300 in accordance with an embodiment. The eye tracking system 300 comprises a structured light emitter 310, a camera assembly 320, and a controller 330. The eye tracking system 215 is an embodiment of the eye tracking system 300. In other embodiments, the eye tracking system 300 comprises additional or fewer modules than those described herein. Similarly, the functions can be distributed among the modules and/or different entities in a different manner than is described here.

The structured light emitter 310 illuminates a portion of an eye 220 within a target area with a dense structured light pattern in accordance with tracking instructions. The structured light emitter 225 is an embodiment of the structured light emitter 310. As discussed above with regard to FIG. 2, in some embodiments, the structure light emitter 310 includes one or more light sources and a feature waveguide. In alternate embodiments, the structured light emitter 310 includes one or more lights sources, one or more DOEs and a projection assembly. A light source may emit light in the visible band (~380 nm to 750 nm), in the infrared (IR) band (~750 nm to 1700 nm), in the ultraviolet band (10 nm to 380 nm), some other portion of the electromagnetic spectrum, or some combination thereof. The light source may be, e.g., a light emitted diode (LED), a micro LED, a laser diode, a tunable laser, etc. However, it is preferable to emit in the infrared band such that the source light is not visible to the user.

The structured light emitter 310 may adjust one or more emission parameters in accordance with the tracking instructions. An emission parameter is a parameter that affects how light is emitted from the structured light emitter 310. An emission parameter may include, e.g., brightness, pulse rate (to include continuous illumination), wavelength, pulse length, some other parameter that affects how light is emitted from the structured light emitter 310, or some combination thereof.

The camera assembly 320 captures images of the dense structured light pattern reflected from the target area. The camera 230 is an embodiment of the camera assembly 320. The reflected light includes, e.g., reflections of the dense structured light pattern from portions of the eye in the target area (e.g., cornea, iris, and/or sclera). The camera assembly 320 includes one or more cameras, and as noted above with regard to FIG. 2, a camera may be, e.g., an array (1D or 2D) of photodiodes, a charge coupled display (CCD) array, some other device capable of detecting some or all of the dense structured light pattern, or some combination thereof. The camera assembly 320 captures the images in accordance with tracking instructions generated by the controller 330.

The camera assembly 320 may adjust one or more imaging parameters in accordance with the tracking instructions. An imaging parameter is a parameter that affects how the camera assembly 320 captures images. An imaging parameter may include, e.g., frame rate, aperture, gain, exposure length, frame timing, some other parameter that affects how the camera assembly 320 captures images, or some combination thereof.

The controller 330 controls components of the eye tracking system 300. The controller 330 comprises a data store 340, a component control module 350, a position estimation module 360, and a calibration module 370. In other embodiments, the controller 330 comprises additional or fewer modules than those described herein. Similarly, the functions can be distributed among the modules and/or different entities in a different manner than is described here.

The data store 340 is a memory that stores information for the eye tracking system 300. The stored information may include, e.g., tracking instructions, emission parameters, imaging parameters, a model (M) of a user's eye, eye tracking information, images captured by the camera assembly 320, some other information that is used by the eye tracking system 300, or some combination thereof. The data store 340 is a memory, such as a read only memory (ROM), dynamic random access memory (DRAM), static random access memory (SRAM), or some combination thereof. The data store 340 may be part of a larger digital memory of a HMD system. The model, M stored in the data store 340 can be a 3D model of a portion of the eye. The portion of the eye may include, e.g., a cornea, an iris, a pupil, a sclera, an anterior chamber, some other portion of the eye, or some combination thereof. The model M describes a geometry of the portion of the eye, and other aspects of the portion of the eye. For example, the model M can also describe indices of refractions for some portions of the eye (e.g., the cornea, the anterior chamber, etc.) as well as air. Additionally, M may also include acceleration vectors and/or velocity vectors for the eye that describe movement of the eye. In embodiments in which both of a user's eyes are scanned, the data store 340 may contain two model's $M_1$ and $M_2$: one for each eye. The model M describes a position of the eye with six degrees of freedom, accordingly, the model M also describes an orientation of the eye. Additionally, in some embodiments, the model M may include a position of the iris relative to the cornea of the eye.

In some embodiments, the model, M, may include of a number of parameters which approximately specify a shape of the eye. For example, these parameters could correspond to an average radius of the eye, an average radius of the sclera of the eye, a set of three parameters to approximate the shape of the sclera as a ellipsoid, a radius of the cornea of the eye, a measurement of the protrusion of the cornea from the sclera, a set of parameters specifying the shape of the cornea, and a point of rotation for the eye. Additional parameters may be used to account for deviations from the ideal model specified by the parameters. For example, a bulge on the eye's surface caused by a blood vessel may be accounted for in M via these additional parameters.

The component control module 350 generates tracking instructions. The tracking instructions control the structured light emitter 310 and the camera assembly 320. The component control module 350 synchronizes the camera assembly 320 with the structured light emitter 310 such that images of the target area include some or all of the dense structured light pattern reflected off a surface of the eye. The component control module 350 may determine one or more emission parameters and/or imaging parameters to, e.g., to increase signal-to-noise ratio of the reflected dense structured light pattern in the captured images. Moreover, the component control module 350 can determine one or more emission parameters to ensure that the power of the dense structured light pattern is within eye safety thresholds. The component control module 350 generates the tracking instructions using the emission parameters and/or the imaging parameters. The component control module 350 provides the tracking instructions to the structured light emitter 310 and/or the camera assembly 320.

The position estimation module 360 determines a position of one or both eyes of the user using one or more images from the camera assembly 320. The position estimation module 360 generates an estimate of the position of the eye based on a model, M from the data store 350 and the one or more images captured by the camera assembly 320. The position estimation module 360 is a software module implemented on one or more processors, a dedicated hardware unit, or some combination thereof.

In some embodiments, the position estimation module 360 generates a 3D approximation of a surface of the eye corresponding to the area of the eye illuminated by the structured light emitter 310. As discussed in detail below with regard to FIG. 4B, the dense structured light pattern includes a plurality of features that are uniquely identifiable. The position estimation module 360 uses the known structure of the projected dense structured light and the model M to determine a distortion of the light caused by the shape of the eye's surface (and to some extent reflections from the iris as described in detail below with regard to FIG. 5). From the distortion, the eye orientation estimation module 460 attributes depth information to different portions of the image. Using the depth information the position estimation module 360 updates a 3D approximation of a portion of the eye. The position estimation module 360 may use the depth information to determine eye tracking information. Eye tracking information can include, e.g., position of an eye, gaze angle, inter-pupillary distance, etc.

Note in conventional eye tracking systems, a location of the pupil is first estimated, and a pupillary axis is inferred based on the estimated location of the pupil, and then some offset is applied to determine the foveal axis (i.e., the gaze direction). In contrast, the eye tracking system 300 does not have to determine pupil location to determine gaze direction. The large number of structured light features in the images of the eye allow for the position estimation module 360 to determine a gaze angle directly from the model without having to compute a pupil location.

The calibration module 370 generates or trains the model M prior to eye tracking during a calibration sequence. The calibration module 370 is a software module implemented on one or more processors, a dedicated hardware unit, or some combination thereof. The calibration sequence implemented by the calibration module 370 may involve instructing the structured light emitter 310 to emit a dense structured light pattern, and have the camera assembly 320 capture images of the dense structured light pattern reflected from the eye as it looks at known locations. In one embodiment, the user is instructed to look at a certain object (e.g., a virtual icon) that is displayed on an electronic display (e.g., of an HMD). And the camera assembly captures an image of the dense structured light pattern reflected from the eye while the user is looking at the object. The location of the object can be displayed at different locations, such that the eye tracking system 300 can capture images of the eye at multiple known orientations. The images of the dense structured light pattern can be interpolated into a model, M, which is stored in the data store 340. Once the calibration module 370 has produced M eye tracking may begin. In general, eye tracking with a model, M trained for a specific user's eye is more accurate than eye tracking without such a model. In some embodiments, the calibration module 370 continues to update M during tracking. In some embodiments, the system may begin tracking with a nominal model M based on statistical norms of human eyes and the calibration module 370 updates M during tracking.

Figure 4A:
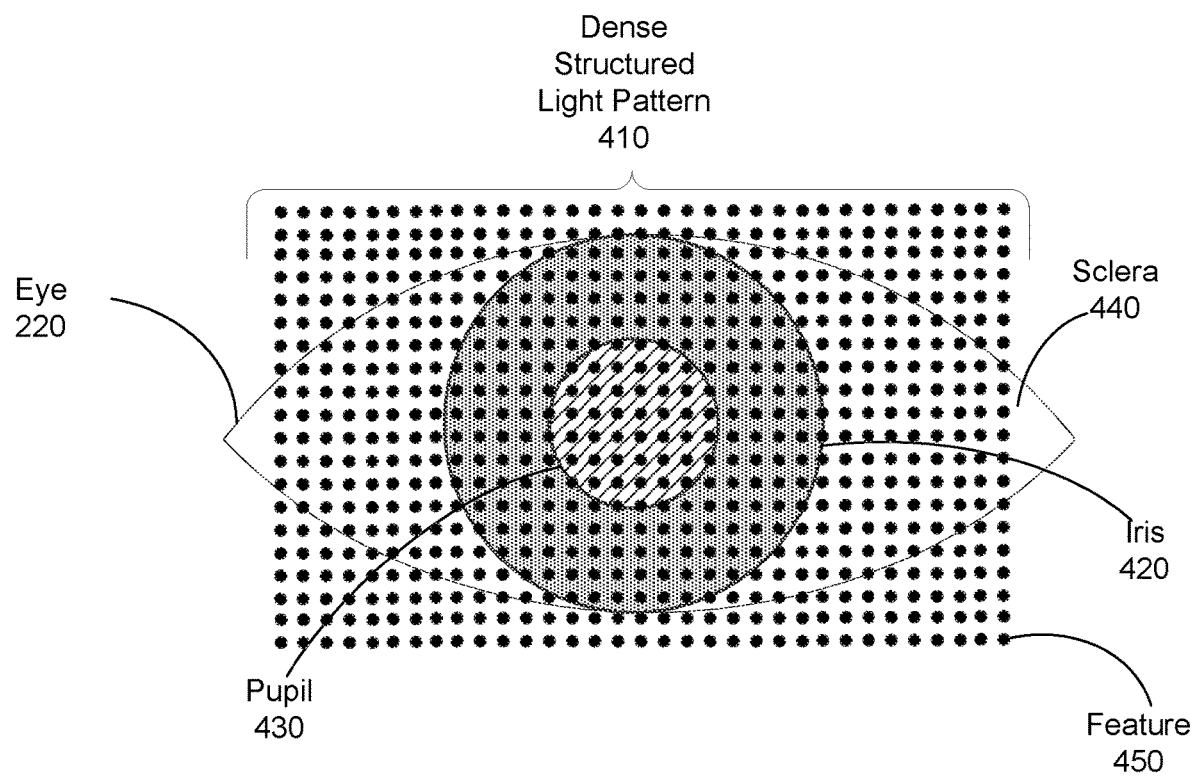
FIG. 4A shows an example dense structured light pattern projected onto an eye, according to an embodiment.

FIG. 4A shows an example dense structured light pattern 410 projected onto an eye 220, according to an embodiment. In this example, the dense structured light pattern 410 is a pattern of a reflectance groups (e.g., dots) projected onto a target area that includes the eye 220. In this embodiment, the dense structured light pattern 410 fills the target area, and the target area includes a cornea of the eye 220 (not illustrated), an iris 420 of the eye 220, a pupil 430 of the eye 220, and some of a sclera 440 of the eye 220.

In this embodiment, the dense structured light pattern 410 is an array of reflectance groups 450. Note that the reflectance groups 450 may include one or more structured light features of different sizes, shapes, and locations then shown in FIG. 4A. Additionally, in alternate embodiments the dense structured light pattern 410 is dynamically projected onto a smaller target area than what is shown in FIG. 4A. For example, the target area may be roughly the size of the iris 420. And the eye tracking system 300 predicts locations of the target area using the eye tracking information, and projects the dense structured light pattern 420 into the target area. Accordingly, as the target area dynamically moves with the eye.

Figure 4B:
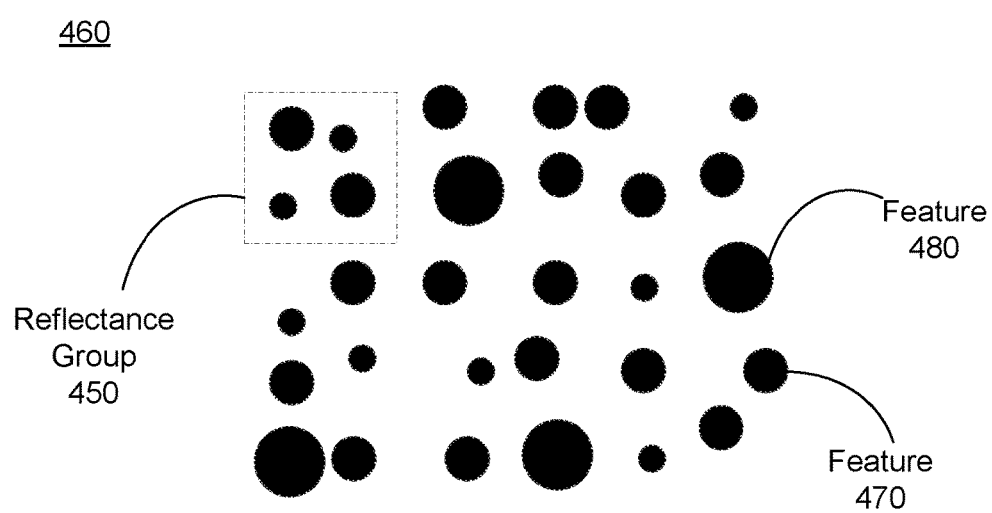
FIG. 4B shows an example of a portion of a dense structured light pattern, according to an embodiment.

FIG. 4B shows an example of a portion 460 of the dense structured light pattern 410, according to an embodiment. In this embodiments, the portion 460 of the dense structured light pattern 410 includes a plurality of reflectance groups 450. In this example, some of the features 450 have different configurations, specifically, feature size.

As noted above with regard to FIG. 2, one or more structured light features form a reflectance group. A reflectance group uniquely identifies its location within the dense structure light pattern 410 based upon its configuration. Configuration may include, e.g., feature shape, feature size, spatial configuration, feature wavelength, feature modulation, or some combination thereof. Feature shape refers to a shape of the feature (e.g., dot, line, etc.). Feature size refers to a physical size of a feature. For example, feature 470 is smaller than feature 480. Spatial configuration refers to respective locations of structured light features relative to one another in a reflectance group. Feature wavelength is the wavelength of light that makes up a feature (e.g., 1050 nm). Feature modulation is a modulation of the feature (e.g., intensity, wavelength, etc.).

Figure 5:
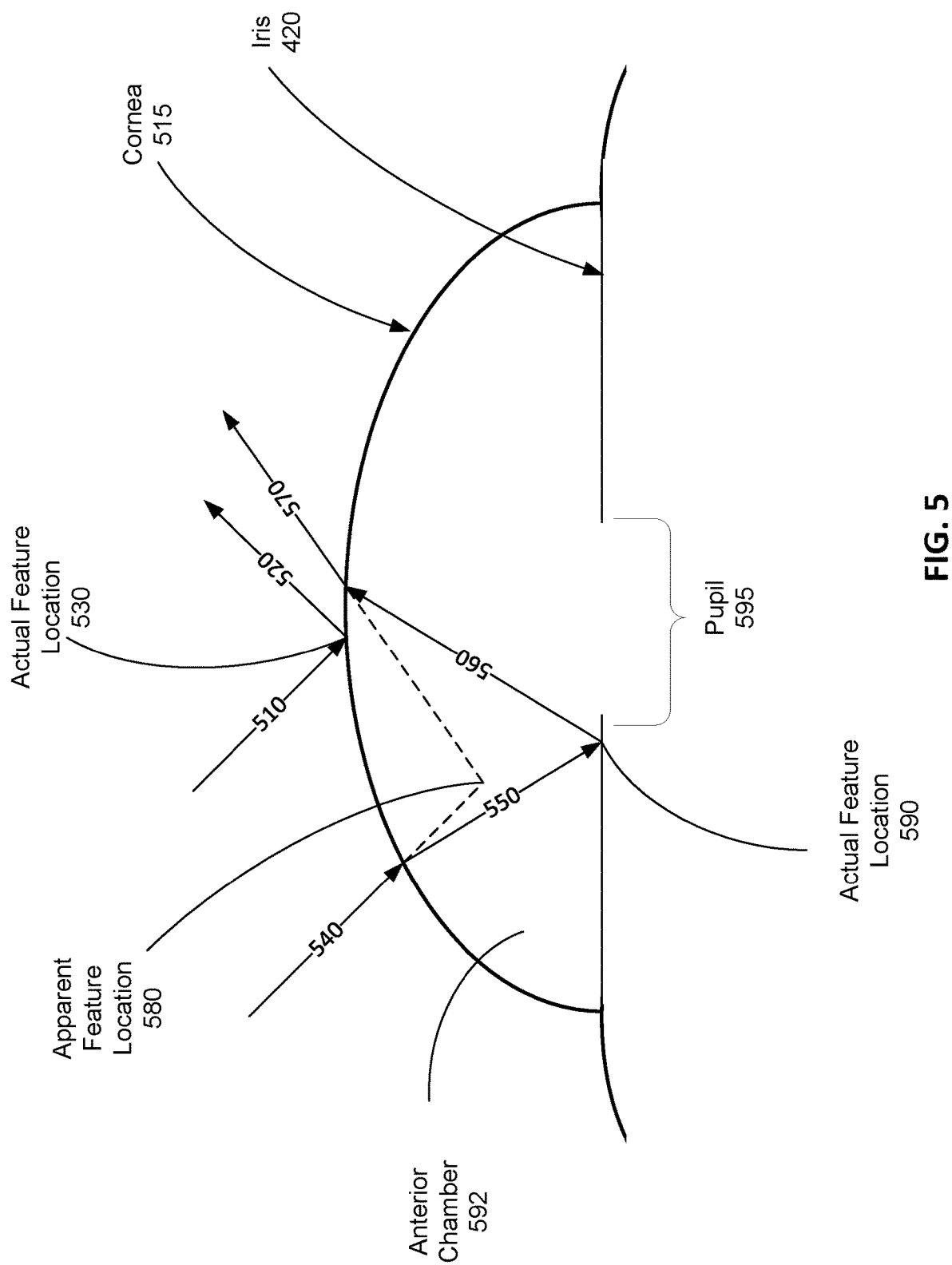
FIG. 5 shows an example of light reflecting from an eye, according to an embodiment.

FIG. 5 shows an example of a light reflecting from the eye 220, according to an embodiment. Conventional eye tracking systems generally only account for corneal reflections, sometimes referred to as "glints," in eye tracking. However, this can lead to inaccuracies in the eye tracking as some of the "glints" are actually reflections from the iris 420 of the eye 220.

In FIG. 5 a beam of light (e.g., structured light) 510 is incident on the cornea 420 of the eye 220. In some instances, some of the light 510 is reflected by a cornea 515 as reflected light 520, and the eye tracking system 530 interprets this reflection location as an actual feature location 530 in tracking the eye 220. But, in some cases, light 540 is incident on the cornea 515, and some portion of the light 540 is transmitted to form transmitted light 550. The transmitted light 550 is reflected by the iris 420 to form reflected light 560, and the reflected light is then transmitted by the cornea 515 to form output light 570. Note that in this case, to a camera (and conventional eye tracking systems), the output light 570 has an apparent feature location 580, but this is not actually a location where the feature is located. An actual feature location 590 is located at the iris 420 where the light 550 is reflected. This offset between the apparent feature location 580 and actual feature location 509 can introduce inaccuracies in conventional eye tracking systems.

In contrast, the model M of the eye tracking system 300 accounts for such offsets. The model M includes an accurate model of the cornea 515 and the iris 420 such that the eye tracking system 300 is able to determine actual feature locations that can be used to determine a position of the eye 220. Additionally, in some cases, the model M may also model a pupil 595 of the eye 220. As noted above with regard to FIG. 3, the model M includes surface geometries for the cornea 115 and the iris 420, and indices of refraction for air, the cornea 515, and an anterior chamber of the eye 220. The eye tracking system 300 calculates a location (e.g., using Snell's Law) of the actual feature location 590 for use in eye tracking, thereby increasing accuracy of eye tracking.

Figure 6:
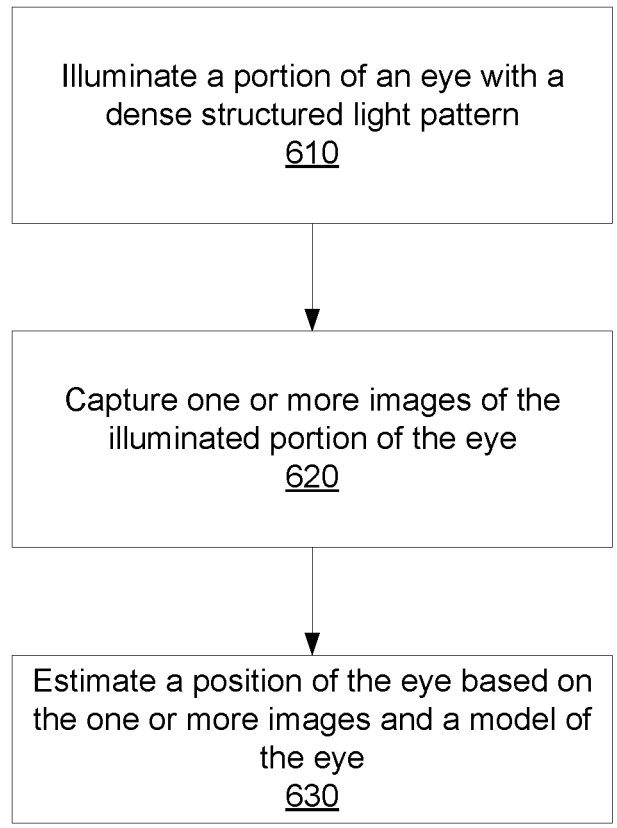
FIG. 6 is a flow chart of an example process for eye tracking using a dense structured light pattern, in accordance with an embodiment.

FIG. 6 is a flow chart of an example process 600 for eye tracking using a dense structured light pattern, in accordance with an embodiment. The process 600 of FIG. 6 may be performed by the eye tracking system 300. Other entities (e.g., a HMD) may perform some or all of the steps of the process in other embodiments. Likewise, embodiments may include different and/or additional steps, or perform the steps in different orders.

The eye tracking system 300 illuminates 610 a portion of an eye (e.g., the eye 220) of a user with a dense structured light pattern. The eye tracking system 300 illuminates the portion of the eye with a dense structured light pattern that is emitted by a structured light emitter (e.g., the structured light emitter 310). The dense structured light pattern is projected by the eye tracking system 300 into a target area that include the portion of the eye. The target area may include, e.g., some or all of, an iris of the eye, a cornea of the eye, sclera of the eye, an anterior chamber of the eye, etc. Reflection of the structured light pattern on parts of the eye (e.g., the cornea and the iris) form a distorted illumination pattern. For example, the dense structured light pattern may have a density of at least 1 structured light feature per 0.5 mm over a target area.

The eye tracking system 300 captures 620 one or more images of the illuminated portion of the eye. The eye tracking system 300 captures the one or more images of the illuminated portion of the eye using a camera assembly (e.g., the camera assembly 320). At least one of the captured images includes the distorted illumination pattern that is associated with the imaged portion of the eye.

The eye tracking system 300 estimates 630 a position of the eye based on the one or more images and a model of the eye. The eye tracking system 300 uses a known structure of the projected dense structured light pattern and a model M of the eye to determine a distortion of the light caused by the shape of the eye (and to some extent reflections from the iris as described in detail below with regard to FIG. 5). From the distortion, the eye tracking system 300 attributes depth information to different portions of the image. Using the depth information the eye tracking system 300 updates a 3D approximation of a portion of the eye stored in the model M. The eye tracking system 300 may use the depth information to determine eye tracking information (e.g., gaze angle), and provide the eye tracking information to a HMD and/or console to facilitate, e.g., foveated rendering, focus adjustment, etc.

HMD System Overview

Figure 7:
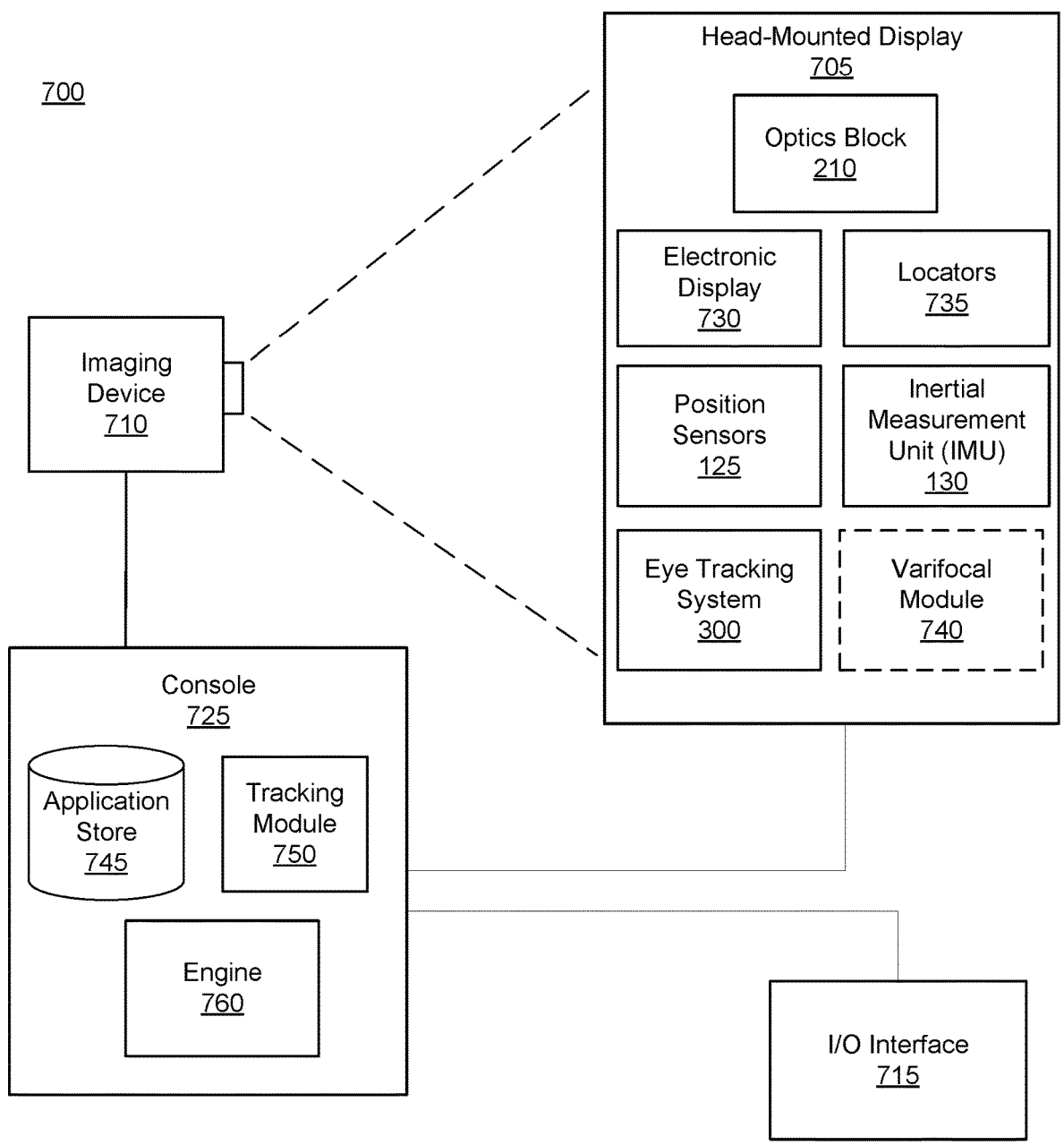
FIG. 7 is a block diagram of a HMD system, in accordance with some embodiments.

FIG. 7 is a HMD system 700 in accordance with an embodiment. The system 700 may be for use as a virtual reality (VR) system, an augmented reality (AR) system, a mixed reality (MR) system, or some combination thereof. In this example, the system 700 includes a HMD 705, an imaging device 710, and an input interface 715, which are each coupled to a console 725. While FIG. 7 shows a single HMD 705, a single imaging device 710, and a single input interface 715, in other embodiments, any number of these components may be included in the system. For example, there may be multiple HMDs 700 each having an associated input interface 715 and being monitored by one or more imaging devices 710, with each HMD 705, input interface 715, and imaging devices 710 communicating with the console 725. In alternative configurations, different and/or additional components may also be included in the system 700.

The HMD 705 may act as a VR, AR, and/or a MR HMD. An MR and/or AR HMD augments views of a physical, real-world environment with computer-generated elements (e.g., images, video, sound, etc.). The HMD 705 presents content to a user. In some embodiments, the HMD 100 is an embodiment of the HMD 705. Example content includes images, video, audio, or some combination thereof. Audio content may be presented via a separate device (e.g., speakers and/or headphones) external to the HMD 705 that receives audio information from the HMD 705, the console 725, or both. The HMD 705 includes an electronic display 730, an optics block 210, one or more locators 735, the position sensors 125, the internal measurement unit (IMU) 130, the eye tracking system 300, and an optional varifocal module 740.

The electronic display 730 displays 2D or 3D images to the user in accordance with data received from the console 725. In various embodiments, the electronic display 730 comprises a single electronic display element (e.g., the electronic display element 205) or multiple electronic displays (e.g., a display for each eye of a user). Examples of the electronic display element include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The optics block 210 magnifies image light received from the electronic display 730, corrects optical errors associated with the image light, and presents the corrected image light to a user of the HMD 705. The optics block 210 includes a plurality of optical elements. Example optical elements included in the optics block 210 include: an aperture, a Fresnel lens, a convex lens, a concave lens, a filter, a reflecting surface, a feature waveguide, or any other suitable optical element that affects image light. Moreover, the optics block 210 may include combinations of different optical elements. In some embodiments, one or more of the optical elements in the optics block 210 may have one or more coatings, such as partially reflective or anti-reflective coatings.

The locators 735 are objects located in specific positions on the HMD 705 relative to one another and relative to a specific reference point on the HMD 705. The locators 135 are an embodiment of the locators 735. A locator 735 may be a light emitting diode (LED), a corner cube reflector, a reflective marker, a type of light source that contrasts with an environment in which the HMD 705 operates, or some combination thereof. Active locators 735 (i.e., an LED or other type of light emitting device) may emit light in the visible band (~380 nm to 750 nm), in the infrared (IR) band (~440 nm to 1700 nm), in the ultraviolet band (10 nm to 380 nm), some other portion of the electromagnetic spectrum, or some combination thereof.

The locators 735 can be located beneath an outer surface of the HMD 705, which is transparent to the wavelengths of light emitted or reflected by the locators 735 or is thin enough not to substantially attenuate the wavelengths of light emitted or reflected by the locators 735. Further, the outer surface or other portions of the HMD 705 can be opaque in the visible band of wavelengths of light. Thus, the locators 735 may emit light in the IR band while under an outer surface of the HMD 705 that is transparent in the IR band but opaque in the visible band.

As described above with reference to FIG. 1, the IMU 130 is an electronic device that generates fast calibration data based on measurement signals received from one or more of the position sensors 125, which generate one or more measurement signals in response to motion of HMD 705. Examples of the position sensors 125 include accelerometers, gyroscopes, magnetometers, other sensors suitable for detecting motion, correcting error associated with the IMU 130, or some combination thereof.

Based on the measurement signals from the position sensors 125, the IMU 130 generates fast calibration data indicating an estimated position of the HMD 705 relative to an initial position of the HMD 705. For example, the position sensors 125 include multiple accelerometers to measure translational motion (forward/back, up/down, left/right) and multiple gyroscopes to measure rotational motion (e.g., pitch, yaw, and roll). The IMU 130 can, for example, rapidly sample the measurement signals and calculate the estimated position of the HMD 705 from the sampled data. For example, the IMU 130 integrates measurement signals received from the accelerometers over time to estimate a velocity vector and integrates the velocity vector over time to determine an estimated position of a reference point on the HMD 705. The reference point is a point that may be used to describe the position of the HMD 705. While the reference point may generally be defined as a point in space, in various embodiments, a reference point is defined as a point within the HMD 705 (e.g., a center of the IMU 130). Alternatively, the IMU 130 provides the sampled measurement signals to the console 725, which determines the fast calibration data.

The IMU 130 can additionally receive one or more calibration parameters from the console 725. As further discussed below, the one or more calibration parameters are used to maintain tracking of the HMD 705. Based on a received calibration parameter, the IMU 130 may adjust one or more of the IMU parameters (e.g., sample rate). In some embodiments, certain calibration parameters cause the IMU 130 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The eye tracking system 300 determines eye tracking information associated with one or both eyes of a user wearing the HMD 705. The eye tracking information determined by the eye tracking system 300 may comprise information about an orientation of the user's eye, i.e., information about an angle of an eye-gaze. The eye tracking system includes a structured light emitter that illuminates one or both eyes of the user with a dense structured light pattern. A camera assembly captures images of the dense structured light pattern reflected by a portion of the eye(s) being tracked. The eye tracking system determines a position of the eye(s) being tracked with up to six degrees of freedom as discussed in detail above with regard to FIGS. 2-6. The eye tracking system 300 then determines eye tracking information using the determined position(s). For example, give position of an eye the eye tracking system 300 can determine a gaze angle.

In some embodiments, the varifocal module 740 is further integrated into the HMD 705. The varifocal module 740 may be coupled to the eye tracking system 300 to obtain eye tracking information determined by the eye tracking system 300. The varifocal module 740 may be configured to adjust focus of one or more images displayed on the electronic display 730, based on the determined eye tracking information obtained from the eye tracking system 300. In this way, the varifocal module 740 can mitigate vergence-accommodation conflict in relation to image light. The varifocal module 740 can be interfaced (e.g., either mechanically or electrically) with at least one of the electronic display 730 and at least one optical element of the optics block 210. Then, the varifocal module 740 may be configured to adjust focus of the one or more images displayed on the electronic display 730 by adjusting position of at least one of the electronic display 730 and the at least one optical element of the optics block 210, based on the determined eye tracking information obtained from the eye tracking system 300. By adjusting the position, the varifocal module 740 varies focus of image light output from the electronic display 730 towards the user's eye. The varifocal module 740 may be also configured to adjust resolution of the images displayed on the electronic display 525 by performing foveated rendering of the displayed images, based at least in part on the determined eye tracking information obtained from the eye tracking system 300. In this case, the varifocal module 740 provides appropriate image signals to the electronic display 730. The varifocal module 740 provides image signals with a maximum pixel density for the electronic display 730 only in a foveal region of the user's eye-gaze, while providing image signals with lower pixel densities in other regions of the electronic display 730.

The imaging device 710 generates slow calibration data in accordance with calibration parameters received from the console 725. Slow calibration data includes one or more images showing observed positions of the locators 735 that are detectable by imaging device 710. The imaging device 710 may include one or more cameras, one or more video cameras, other devices capable of capturing images including one or more locators 735, or some combination thereof. Additionally, the imaging device 710 may include one or more filters (e.g., for increasing signal to noise ratio). The imaging device 710 is configured to detect light emitted or reflected from the locators 735 in a field of view of the imaging device 710. In embodiments where the locators 735 include passive elements (e.g., a retroreflector), the imaging device 710 may include a light source that illuminates some or all of the locators 735, which retro-reflect the light towards the light source in the imaging device 710. Slow calibration data is communicated from the imaging device 710 to the console 725, and the imaging device 710 receives one or more calibration parameters from the console 725 to adjust one or more imaging parameters (e.g., focal length, focus, frame rate, ISO, sensor temperature, shutter speed, aperture, etc.).

The input interface 715 is a device that allows a user to send action requests to the console 725. An action request is a request to perform a particular action. For example, an action request may be to start or end an application or to perform a particular action within the application. The input interface 715 may include one or more input devices. Example input devices include a keyboard, a mouse, a game controller, or any other suitable device for receiving action requests and communicating the received action requests to the console 725. An action request received by the input interface 715 is communicated to the console 725, which performs an action corresponding to the action request. In some embodiments, the input interface 715 may provide haptic feedback to the user in accordance with instructions received from the console 725. For example, haptic feedback is provided by the input interface 715 when an action request is received, or the console 725 communicates instructions to the input interface 715 causing the input interface 715 to generate haptic feedback when the console 725 performs an action.

The console 725 provides content to the HMD 705 for presentation to the user in accordance with information received from the imaging device 710, the HMD 705, or the input interface 715. In the example shown in FIG. 7, the console 725 includes an application store 745, a tracking module 750, and an engine 760. Some embodiments of the console 725 have different or additional modules than those described in conjunction with FIG. 7. Similarly, the functions further described below may be distributed among components of the console 725 in a different manner than is described here.

The application store 745 stores one or more applications for execution by the console 725. An application is a group of instructions, that when executed by a processor, generates content for presentation to the user. Content generated by an application may be in response to inputs received from the user via movement of the HMD 705 or the input interface 715. Examples of applications include gaming applications, conferencing applications, video playback application, or other suitable applications.

The tracking module 750 calibrates the system 700 using one or more calibration parameters and may adjust one or more calibration parameters to reduce error in determining position of the HMD 705. For example, the tracking module 750 adjusts the focus of the imaging device 710 to obtain a more accurate position for observed locators 735 on the HMD 705. Moreover, calibration performed by the tracking module 750 also accounts for information received from the IMU 215. Additionally, if tracking of the HMD 705 is lost (e.g., imaging device 710 loses line of sight of at least a threshold number of locators 735), the tracking module 750 re-calibrates some or all of the system 700 components.

Additionally, the tracking module 750 tracks the movement of the HMD 705 using slow calibration information from the imaging device 710 and determines positions of a reference point on the HMD 705 using observed locators from the slow calibration information and a model of the HMD 705. The tracking module 750 also determines positions of the reference point on the HMD 705 using position information from the fast calibration information from the IMU 215 on the HMD 705. Additionally, the tracking module 750 may use portions of the fast calibration information, the slow calibration information, or some combination thereof, to predict a future location of the HMD 705, which is provided to the engine 760.

The engine 760 executes applications within the system 700 and receives position information, acceleration information, velocity information, predicted future positions, or some combination thereof for the HMD 705 from the tracking module 750. Based on the received information, the engine 760 determines content to provide to the HMD 705 for presentation to the user, such as a virtual scene, one or more virtual objects to overlay onto a real world scene, etc. Additionally, the engine 760 performs an action within an application executing on the console 725 in response to an action request received from the input interface 715 and provides feedback to the user that the action was performed. The provided feedback may be visual or audible feedback via the HMD 705 or haptic feedback via VR input interface 715.

In some embodiments, the engine 760 estimates one or more future positions of the HMD 705 using the fast calibration data from the HMD 705. The engine 760 generates warping parameters based on the one or more estimated future positions, and provides 760 the warping parameters to the HMD 705 with the content.

In some embodiments, based on the eye tracking information (e.g., orientation of the user's eye) received from the eye tracking system 300, the engine 760 determines resolution of the content provided to the HMD 705 for presentation to the user on the electronic display 730. The engine 760 provides the content to the HMD 705 having a maximum pixel resolution on the electronic display 730 in a foveal region of the user's gaze, whereas the engine 760 provides a lower pixel resolution in other regions of the electronic display 730, thus achieving less power consumption at the HMD 705 and saving computing cycles of the console 725 without compromising a visual experience of the user. In some embodiments, the engine 760 can further use the eye tracking information to adjust where objects are displayed on the electronic display 730 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eye tracking system comprising:
a structured light emitter configured to illuminate a portion of an eye of a user with a dense structured light pattern, wherein the dense structured light pattern produces a distorted illumination pattern on the portion of the eye;
a camera assembly configured to capture one or more images of the distorted illumination pattern that is associated with the portion of the eye; and
a controller configured to estimate a position of the eye based on the captured one or more images and a model of the eye.

2. The eye tracking system of claim 1, wherein the dense structured light pattern includes a plurality of structured light features that have a density of at least 1 structured light feature per 0.5 mm over a target area.

3. The eye tracking system of claim 2, wherein the target area is at least 12 mm in diameter.

4. The eye tracking system of claim 1, wherein the dense structured light pattern includes a plurality of reflectance groups, and each reflectance group has a unique configuration and includes one or more structured light features.

5. The eye tracking system of claim 4, wherein the unique configuration for a reflectance group is determined using one or more feature configurations selected from a group consisting of: feature shapes, feature sizes, spatial configurations, feature wavelengths, and feature modulation.

6. The eye tracking system of claim 1, wherein the model describes the position of the eye with up to six degrees of freedom.

7. The eye tracking system of claim 1, wherein the model includes an index of refraction for a cornea of the eye and an index of refraction for an anterior chamber of the eye.

8. The eye tracking system of claim 7, wherein the dense structured light pattern includes a plurality of structured light features that are reflected by the eye, and the controller is further configured to:
identify an apparent location of a feature, of the plurality of structured light features, on a cornea of the eye;
calculate an actual location of the feature using the index of refraction of the cornea and the index of refraction of the anterior chamber, wherein the actual location is on an iris of the eye; and
wherein the estimated position of the eye is determined using the actual location of the feature.

9. The eye tracking system of claim 1, wherein the eye tracking system is part of a head-mounted display.

10. A head-mounted display (HMD) comprising:
a structured light emitter configured to illuminate a portion of an eye of a user with a dense structured light pattern, wherein the dense structured light pattern produces a distorted illumination pattern on the portion of the eye;
a camera assembly configured to capture one or more images of the distorted illumination pattern that is associated with the portion of the eye; and
a controller configured to estimate a position of the eye based on the captured one or more images and a model of the eye.

11. The HMD of claim 10, wherein the dense structured light pattern includes a plurality of structured light features that have a density of at least 1 structured light feature per 0.5 mm over a target area.

12. The HMD of claim 11, wherein the target area is at least 12 mm in diameter.

13. The HMD of claim 10, wherein the dense structured light pattern includes a plurality of reflectance groups, and each reflectance group has a unique configuration and includes one or more structured light features.

14. The HMD of claim 13, wherein the unique configuration for a reflectance group is determined using one or more feature configurations selected from a group consisting of: feature shapes, feature sizes, spatial configurations, feature wavelengths, and feature modulation.

15. The HMD of claim 10, wherein the model describes the position of the eye with up to six degrees of freedom.

16. The HMD of claim 10, wherein the model includes an index of refraction for a cornea of the eye and an index of refraction for an anterior chamber of the eye.

17. The HMD of claim 16, wherein the dense structured light pattern includes a plurality of features that are reflected by the eye, and the controller is further configured to:
identify an apparent location of a feature, of the plurality of features, on a cornea of the eye;
calculate an actual location of the feature using the index of refraction of the cornea and the index of refraction of the anterior chamber, wherein the actual location is on an iris of the eye; and
wherein the estimated position of the eye is determined using the actual location of the feature.

18. A method comprising:
illuminating, by a structured light emitter, a portion of an eye of a user with a dense structured light pattern, wherein the dense structured light pattern produces a distorted illumination pattern on the portion of the eye;
capturing, by a camera assembly, one or more images of the distorted illumination pattern that is associated with the portion of the eye; and
estimating, by a controller, a position of the eye based on the captured one or more images and a model of the eye.

* * * * *